United States Patent
Hoffman et al.

(10) Patent No.: US 11,092,169 B2
(45) Date of Patent: Aug. 17, 2021

(54) HYDRAULIC ENERGY TRANSFER SYSTEM WITH FILTERING SYSTEM

(71) Applicant: Energy Recovery, Inc., San Leandro, CA (US)

(72) Inventors: Adam Rothschild Hoffman, San Francisco, CA (US); Farshad Ghasripoor, Berkeley, CA (US); Jeremy Grant Martin, Oakland, CA (US); David Deloyd Anderson, Castro Valley, CA (US)

(73) Assignee: Energy Recovery, Inc., San Leandro, CA (US)

( * ) Notice: Subject to any disclaimer, the term of this patent is extended or adjusted under 35 U.S.C. 154(b) by 0 days.

(21) Appl. No.: 16/775,767

(22) Filed: Jan. 29, 2020

(65) Prior Publication Data
US 2020/0166054 A1 May 28, 2020

Related U.S. Application Data

(62) Division of application No. 15/613,502, filed on Jun. 5, 2017, now Pat. No. 10,550,857.

(51) Int. Cl.
| | |
|---|---|
| *F04F 13/00* | (2009.01) |
| *F04B 53/20* | (2006.01) |
| *F04B 53/08* | (2006.01) |
| *F04B 53/18* | (2006.01) |
| *F15B 21/041* | (2019.01) |
| *B01D 11/02* | (2006.01) |

(Continued)

(52) U.S. Cl.
CPC .......... *F04F 13/00* (2013.01); *B01D 11/0226* (2013.01); *F04B 53/08* (2013.01); *F04B 53/18* (2013.01); *F04B 53/20* (2013.01); *F15B 21/041* (2013.01); *E21B 7/18* (2013.01); *F04B 49/065* (2013.01)

(58) Field of Classification Search
CPC ........ F04F 13/00; B01D 11/0226; E21B 7/18; F04B 53/08; F04B 53/18; F04B 53/20; F04B 49/065
USPC .......................................................... 417/64
See application file for complete search history.

(56) References Cited

U.S. PATENT DOCUMENTS

| | | |
|---|---|---|
| 3,221,984 A | 12/1965 | Ditzler |
| 3,240,424 A | 3/1966 | Richardson |
| 3,431,747 A | 3/1969 | Hashemi et al. |

(Continued)

FOREIGN PATENT DOCUMENTS

| | | |
|---|---|---|
| CN | 1272166 A | 11/2000 |
| CN | 102679120 A | 9/2012 |

(Continued)

OTHER PUBLICATIONS

International Search Report and Written Opinion mailed on application No. PCT/US2018/033595, dated Aug. 21, 2018.

*Primary Examiner* — Charles G Freay
(74) *Attorney, Agent, or Firm* — Lowenstein Sandler LLP

(57) ABSTRACT

A system includes a hydraulic energy transfer system configured to exchange pressures between a first fluid and a second fluid, wherein pressure of the first fluid is greater than pressure of the second fluid. The system also includes a lubrication system coupled to the hydraulic energy transfer system and configured to pump or direct a lubrication fluid into the hydraulic energy transfer system.

18 Claims, 9 Drawing Sheets

(51) Int. Cl.
    E21B 7/18       (2006.01)
    F04B 49/06      (2006.01)

(56) References Cited

U.S. PATENT DOCUMENTS

| | | |
|---|---|---|
| 3,560,053 A | 2/1971 | Ortloff |
| 3,575,264 A | 4/1971 | Johnson |
| 3,746,128 A | 7/1973 | Wunsch |
| 4,808,070 A | 2/1989 | Fonda-Bonardi |
| 5,924,286 A | 7/1999 | Kapich |
| 6,540,487 B2 | 4/2003 | Polizos et al. |
| 6,659,731 B1 | 12/2003 | Hauge |
| 9,739,128 B2 | 8/2017 | Ghasripoor |
| 10,550,857 B2 * | 2/2020 | Hoffman ............ B01D 11/0226 |
| 2007/0137170 A1 * | 6/2007 | Brass ..................... F04F 13/00 |
| | | 60/39.45 |
| 2008/0230317 A1 | 9/2008 | Jen et al. |
| 2011/0008182 A1 | 1/2011 | Krogsgard et al. |
| 2015/0184492 A1 * | 7/2015 | Ghasripoor ............ F04F 13/00 |
| | | 166/250.01 |
| 2015/0184502 A1 | 7/2015 | Krish et al. |
| 2016/0160849 A1 | 6/2016 | Gains-Germain et al. |
| 2016/0160856 A1 | 6/2016 | Wallin et al. |
| 2016/0160889 A1 | 6/2016 | Hoffman et al. |
| 2016/0160890 A1 | 6/2016 | Anderson |
| 2016/0206981 A1 | 7/2016 | Pursifull |

FOREIGN PATENT DOCUMENTS

| | | |
|---|---|---|
| CN | 106795751 A | 5/2017 |
| SU | 1495529 A2 | 7/1989 |

* cited by examiner

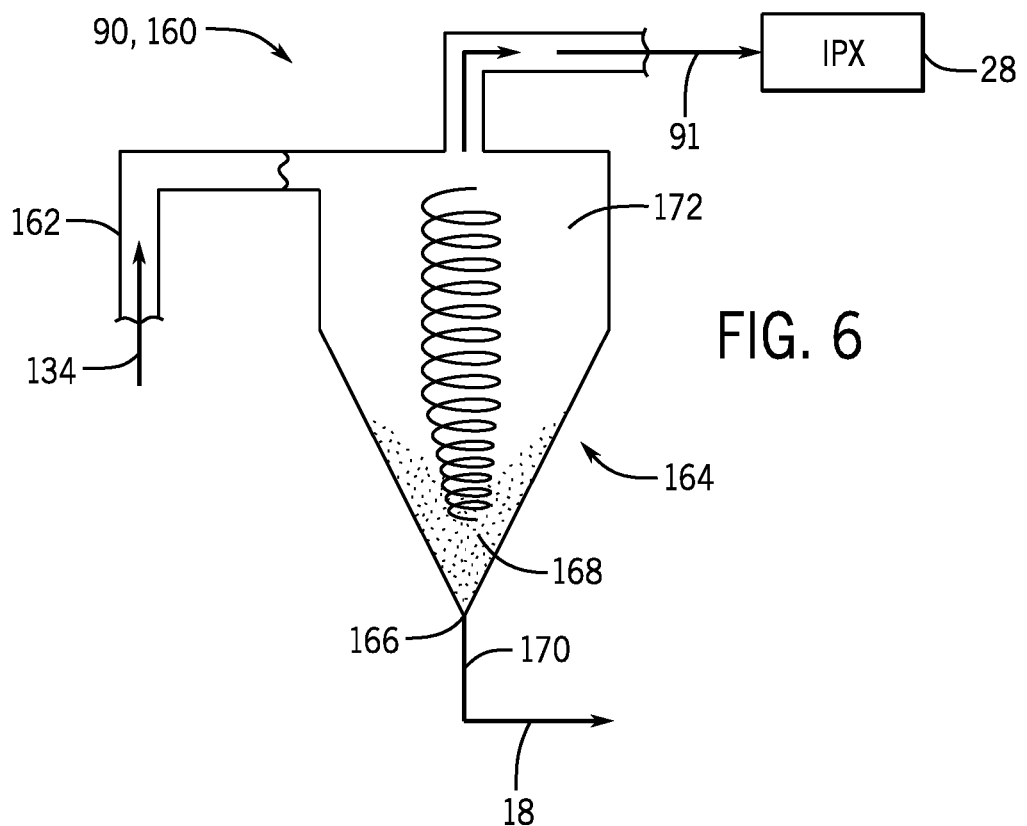
FIG. 6
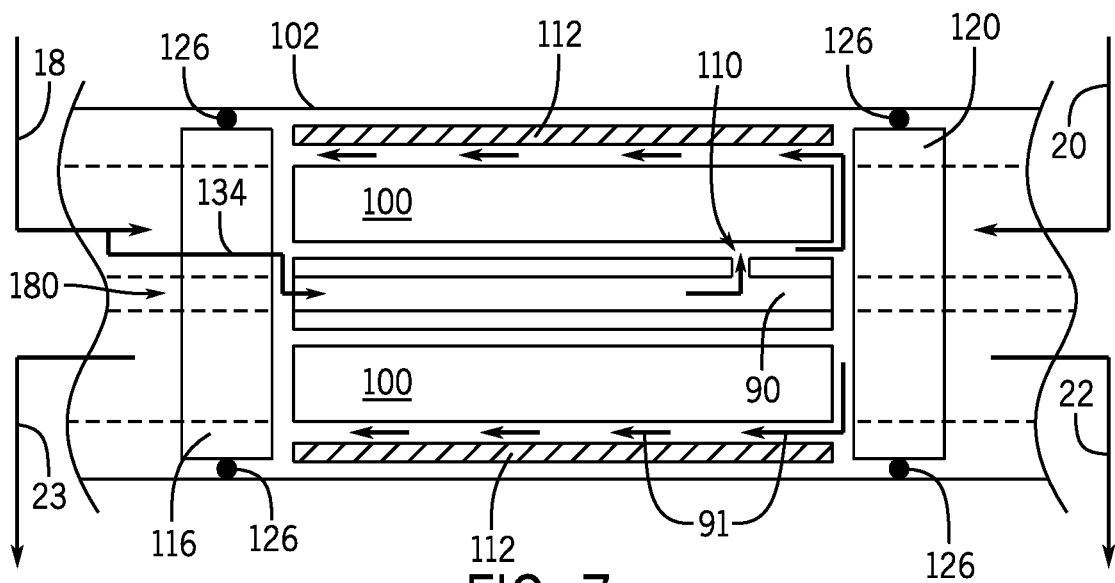
FIG. 7
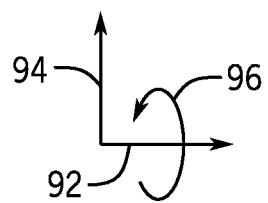

HYDRAULIC ENERGY TRANSFER SYSTEM WITH FILTERING SYSTEM

CROSS REFERENCE TO RELATED APPLICATIONS

This application is a divisional of U.S. Non-Provisional patent application Ser. No. 15/613,502, entitled "HYDRAULIC ENERGY TRANSFER SYSTEM WITH FILTERING SYSTEM," filed on Jun. 5, 2017, which is herein incorporated by reference in its entirety.

BACKGROUND

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

The subject matter disclosed herein relates to fluid handling equipment and, in particular, fluid handling equipment for applications involving a variety of fluids. Some of these fluids may include solids (e.g., particles, powders, debris, particulates) and/or contaminants (e.g., viscosifiers, chemical additives, or any fluids that are undesirable for bearing lubrication), which may interfere with the operation of the fluid handling equipment. Fluid handling equipment may be used in a variety of applications. For example, fluid handling equipment may be used in hydraulic fracturing, in a drilling application (circulating drilling fluids and/or mud), or similar processes. In particular, well completion operations in the oil and gas industry often involve hydraulic fracturing (commonly referred to as fracking or fracing) to increase the release of oil and gas in rock formations. Hydraulic fracturing involves pumping a fluid containing a combination of water, chemicals, and proppant (e.g., sand, ceramics) into a well at high pressures. The high-pressures of the fluid increases crack size and propagation through the rock formation releasing more oil and gas, while the proppant prevents the cracks from closing once the fluid is depressurized.

Fracturing operations use a variety of rotating equipment, such as a hydraulic energy transfer system, to handle a variety of fluids that may include solids (e.g., particles, powders, debris, particulates) and/or contaminants (e.g., viscosifiers, chemical additives, or any fluids that are undesirable for bearing lubrication). In certain circumstances, the solids may prevent the rotating components of the rotating equipment from rotating. Thus, the rotating equipment may be taken out of service to enable the solids to be removed and/or enable the rotating components to be rotated. In some situations, lubrication systems may facilitate the rotation of the rotating components within the hydraulic energy transfer system. However, the fluids utilized within the lubrication systems may include additional solids or contaminants, such as particles, powders, debris, and so forth, and these solids or contaminants may have negative impacts on performance of the rotating components (e.g., decreased performance/efficiency, abrasion to components, etc.).

BRIEF DESCRIPTION

In one embodiment, a system includes a hydraulic energy transfer system configured to exchange pressures between a first fluid and a second fluid, wherein pressure of the first fluid is greater than pressure of the second fluid. The system also includes a lubrication system coupled to the hydraulic energy transfer system and configured to pump or direct a lubrication fluid into the hydraulic energy transfer system.

In another embodiment, a system includes a hydraulic energy transfer system configured to exchange pressures between a first fluid and a second fluid, wherein pressure of the first fluid is greater than pressure of the second fluid. The system includes a lubrication system coupled to the hydraulic energy transfer system and configured to pump or direct a lubrication fluid into the hydraulic energy transfer system. The system includes a filtration system coupled to the hydraulic energy transfer system and configured to filter the lubrication fluid before the lubrication fluid enters the hydraulic energy transfer system. The system includes one or more valves and one or more pumps disposed along fluid flow paths of the system. The system also includes a controller programmed to control the one or more valves and/or the one or more pumps of the system to selectively route the lubrication fluid into the hydraulic energy transfer system based on operating condition of the system.

In another embodiment, a system includes a hydraulic energy transfer system configured to exchange pressures between a first fluid and a second fluid, wherein pressure of the first fluid is greater than pressure of the second fluid. The system includes a lubrication system coupled to the hydraulic energy transfer system and the lubrication system includes a dedicated pump to direct a lubrication fluid into the hydraulic energy transfer system. The system includes a filtration system coupled to the hydraulic energy transfer system and configured to filter the lubrication fluid before the lubrication fluid enters the hydraulic energy transfer system, wherein the lubrication fluid includes a fraction of the first fluid or a fluid from a fluid supply source external to the hydraulic energy transfer system. The system also includes a controller programmed to control one or more valves and/or one or more pumps disposed along fluid flow paths of the system to selectively route the lubrication fluid into the hydraulic energy transfer system based on an operating condition of the system.

BRIEF DESCRIPTION OF THE DRAWINGS

Various features, aspects, and advantages of the present invention will become better understood when the following detailed description is read with reference to the accompanying figures in which like characters represent like parts throughout the figures, wherein:

FIG. 6 is a schematic diagram of an embodiment of the filtration system of FIG. 3, illustrating a centrifugal separation filtration system;

FIG. 7 is a schematic diagram of an embodiment of the IPX system of FIG. 2, illustrating a filtration system disposed within the rotor.

DETAILED DESCRIPTION OF SPECIFIC EMBODIMENTS

Figure 1:
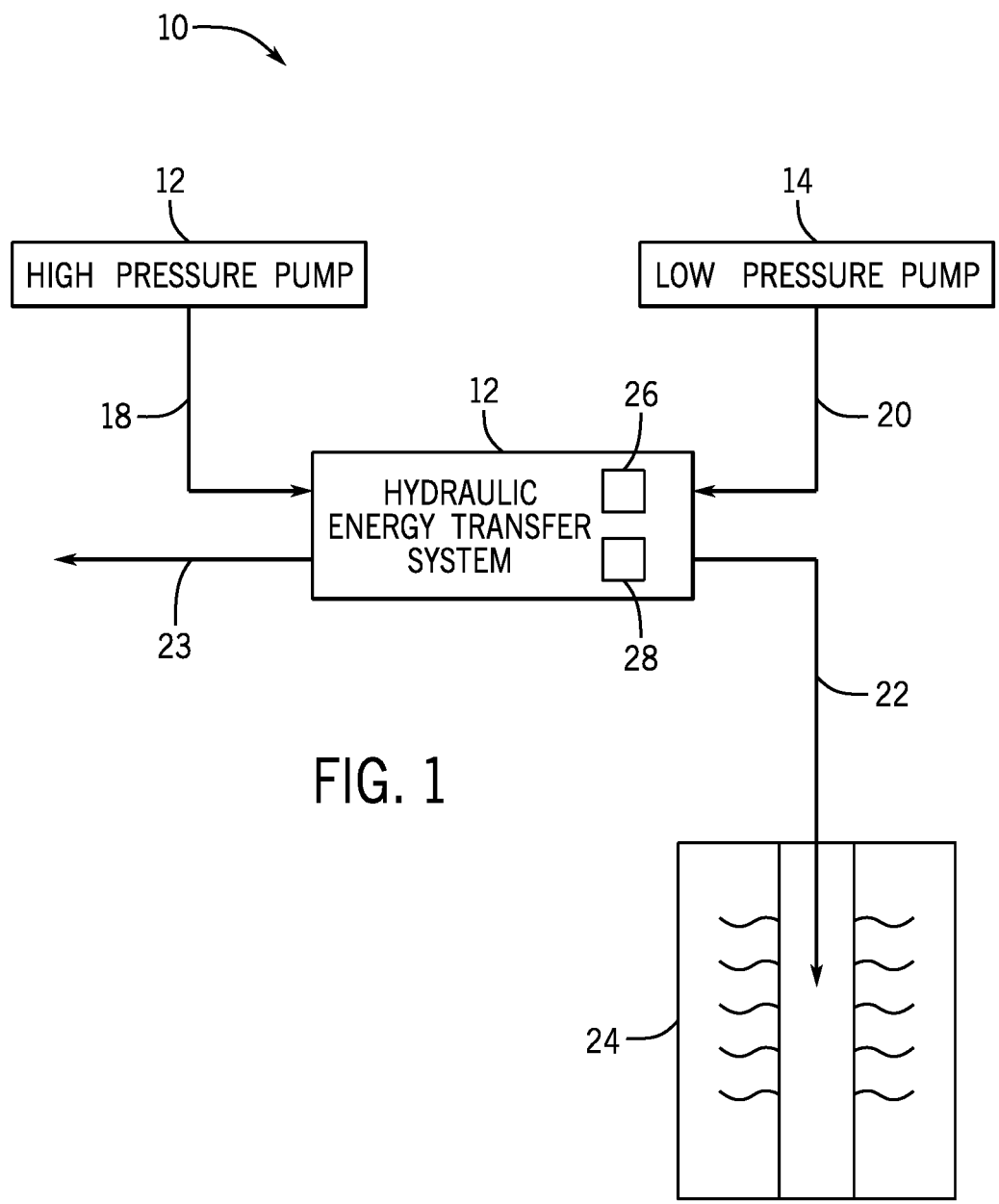
FIG. 1 is a schematic diagram of an embodiment of a frac system with a hydraulic energy transfer system.

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As discussed above, clean lubrication fluid may be important to the operation of rotating equipment, such as rotating components within a hydraulic energy transfer system (e.g., rotary pressure exchanger). A small amount of particulates or contaminants in the lubrication fluid or lube may affect the equipment performance causing the rotating components to stall, causing wearing or abrasion of the rotating components, or otherwise adversely affecting performance. With this in mind, the present embodiments are directed to systems and methods to provide a clean/suitable fluid for lube flow and fluid bearings and seals. A dedicated external pump may be used for providing the lube flow, and a filtration system may filter or clean only a small portion of the total fluid flow into the rotating equipment, as compared to the entire fluid flow. As such, the present embodiments may offer advantages, such as cost saving, easier maintenance, and energy saving as comparing to filtering the entire fluid flow.

As discussed in detail below, the embodiments disclosed herein generally relate to fluid handling equipment that may be used in many applications to handle a variety of fluids that may include solids (e.g., particles, powders, debris, particulates) and/or contaminants (e.g., viscosifiers, chemical additives, or any fluids that are undesirable for bearing lubrication). For example, fluid handling equipment may be used in fracturing application, such as in a hydraulic fracturing system. Hydraulic fracturing systems and operations use a variety of rotating equipment, such as a hydraulic energy transfer system, to handle a variety of fluids. As noted above, lubrication systems may facilitate the rotation of the rotating components within the hydraulic energy transfer system. However, in some situations, the fluids utilized within the lubrication systems may include additional solids, such as such as particles, powders, debris, and so forth. Accordingly, the disclosed embodiments relate to filtering a lubrication fluid that may be used within a lubrication system of the hydraulic energy transfer system.

A frac system (or hydraulic fracturing system) includes a hydraulic energy transfer system that transfers work and/or pressure between first and second fluids, such as a pressure exchange fluid (e.g., a substantially proppant-free fluid, such as water) and a hydraulic fracturing fluid (e.g., a proppant-laden frac fluid). The hydraulic energy transfer system may also be described as a hydraulic protection system, hydraulic buffer system, or a hydraulic isolation system, because it may block or limit contact between a frac fluid and various hydraulic fracturing equipment (e.g., high-pressure pumps) while exchanging work and/or pressure with another fluid. The hydraulic energy transfer system may include a hydraulic turbocharger or a hydraulic pressure exchange system, such as a rotating isobaric pressure exchanger (IPX).

In certain embodiments, the IPX may include one or more chambers (e.g., 1 to 100) to facilitate pressure transfer and equalization of pressures between volumes of first and second fluids (e.g., gas, liquid, or multi-phase fluid). For example, one of the fluids (e.g., the frac fluid) may be a multi-phase fluid, which may include gas/liquid flows, gas/solid particulate flows, liquid/solid particulate flows, gas/liquid/solid particulate flows, or any other multi-phase flow. In some embodiments, the pressures of the volumes of first and second fluids may not completely equalize. Thus, in certain embodiments, the IPX may operate isobarically, or the IPX may operate substantially isobarically (e.g., wherein the pressures equalize within approximately +/−1, 2, 3, 4, 5, 6, 7, 8, 9, or 10 percent of each other). In certain embodiments, a first pressure of a first fluid (e.g., pressure exchange fluid) may be greater than a second pressure of a second fluid (e.g., frac fluid). For example, the first pressure may be between approximately 5,000 kPa to 25,000 kPa, 20,000 kPa to 50,000 kPa, 40,000 kPa to 75,000 kPa, 75,000 kPa to 100,000 kPa or greater than the second pressure. Thus, the IPX may be used to transfer pressure from a first fluid (e.g., pressure exchange fluid) at a higher pressure to a second fluid (e.g., frac fluid) at a lower pressure. In some embodiments, the IPX may transfer pressure between a first fluid (e.g., pressure exchange fluid, such as a first proppant free or substantially proppant free fluid) and a second fluid that may be highly viscous and/or contain proppant (e.g., frac fluid containing sand, solid particles, powders, debris, ceramics). In operation, the hydraulic energy transfer system helps to block or limit contact between the second proppant containing fluid and various fracturing equipment (e.g., high-pressure pumps) during fracturing operations. By blocking or limiting contact between various fracturing equipment and the second proppant containing fluid, the hydraulic energy transfer system increases the life/performance while reducing abrasion/wear of various fracturing equipment (e.g., high-pressure pumps). Moreover, it may enable the use of cheaper equipment in the fracturing system by using equipment (e.g., high-pressure pumps) not designed for abrasive fluids (e.g., frac fluids and/or corrosive fluids).

With the foregoing in mind, FIG. 1 is a schematic diagram of an embodiment of a fracturing equipment or a frac system 10 with a hydraulic energy transfer system. It should be noted that the hydraulic energy transfer system discussed herein may also be used in any suitable applications to handle a variety of fluids, and the use of the hydraulic energy transfer system in fracturing application is discussed herein as an example. In operation, the frac system 10 enables well completion operations to increase the release of oil and gas in rock formations. Specifically, the frac system 10 pumps a frac fluid containing a combination of water, chemicals, and proppant (e.g., sand, ceramics, etc.) into a well at high-pressures. The high-pressures of the frac fluid increases crack size and propagation through the rock formation, which releases more oil and gas, while the proppant prevents the cracks from closing once the frac fluid is depressurized. As illustrated, the frac system 10 includes a high-pressure pump 12 and a low-pressure pump 14 coupled to a hydraulic energy transfer system 16 (e.g., a hydraulic turbocharger or IPX). In operation, the hydraulic energy transfer system 16 transfers pressures between a first fluid 18 (e.g., proppant free fluid) pumped by the high-pressure pump 12 and a second fluid 20 (e.g., proppant containing fluid or frac fluid) pumped by the low-pressure pump 14. In this manner, the hydraulic energy transfer system 16 blocks or limits wear on the high-pressure pump 12, while enabling the frac system 10 to pump a high-pressure frac fluid 22 into a downstream application 24, such as a well, and to pump a low-pressure frac fluid 23 (e.g., proppant free fluid or frac fluid) out of the hydraulic energy transfer system 16.

In an embodiment, the hydraulic energy transfer system 16 may include a hydraulic turbocharger 26, the first fluid 18 (e.g., high-pressure proppant free fluid) enters a first side of the hydraulic turbocharger 26 and the second fluid 20 (e.g., low-pressure frac fluid) may enter the hydraulic turbocharger 26 on a second side. In operation, the flow of the first fluid 18 drives a first turbine coupled to a shaft. As the first turbine rotates, the shaft transfers power to a second turbine that increases the pressure of the second fluid 20, which drives the second fluid 20 out of the hydraulic turbocharger 26 and down the downstream application 24 (e.g., a well) during fracturing operations. In an embodiment, the hydraulic energy transfer system 16 may include an isobaric pressure exchanger (IPX) 28, the first fluid 18 (e.g., high-pressure proppant free fluid) enters a first side of the hydraulic energy transfer system 16 where the first fluid contacts the second fluid 20 (e.g., low-pressure frac fluid) entering the IPX 28 on a second side. The contact between the fluids enables the first fluid 18 to increase the pressure of the second fluid 20, which drives the second fluid 20 out of the IPX 28 and down the downstream application 24 (e.g., a well) for fracturing operations. The first fluid 18 similarly exits the IPX 28, but at a low-pressure after exchanging pressure with the second fluid 20.

As used herein, the IPX 28 may be generally defined as a device that transfers fluid pressure between a high-pressure inlet stream and a low-pressure inlet stream at efficiencies in excess of approximately 50%, 60%, 70%, or 80% without utilizing centrifugal technology. In this context, high pressure refers to pressures greater than the low pressure. The low-pressure inlet stream of the IPX 28 may be pressurized and exit the IPX 28 at high pressure (e.g., at a pressure greater than that of the low-pressure inlet stream), and the high-pressure inlet stream may be depressurized and exit the IPX 28 at low pressure (e.g., at a pressure less than that of the high-pressure inlet stream). Additionally, the IPX 28 may operate with the high-pressure fluid directly applying a force to pressurize the low-pressure fluid, with or without a fluid separator between the fluids. Examples of fluid separators that may be used with the IPX 28 include, but are not limited to, pistons, bladders, diaphragms and the like. In certain embodiments, IPX 28 may include one or more rotary devices (e.g., rotary IPX), such as those manufactured by Energy Recovery, Inc. of San Leandro, Calif. The rotary IPX may not have any separate valves, since the effective valving action is accomplished internal to the device via the relative motion of a rotor with respect to end covers, as described in detail below with respect to FIG. 2. Rotary IPXs may be designed to operate with internal pistons to isolate fluids and transfer pressure with relatively little mixing of the inlet fluid streams. In certain embodiments, IPX 28 may include one or more reciprocating rotary IPXs that may each include a piston moving back and forth in a cylinder for transferring pressure between the fluid streams. One or more IPXs 28 may be used in the disclosed embodiments, such as, but not limited to, rotary IPX(s), reciprocating IPX(s), or any combination thereof. In addition, the IPX 28 may be disposed on a skid separate from the other components of a fluid handling system (e.g., fracturing equipment or the frac system 10), which may be desirable in situations in which the IPX 28 is added to an existing fluid handling system.

Figure 2:
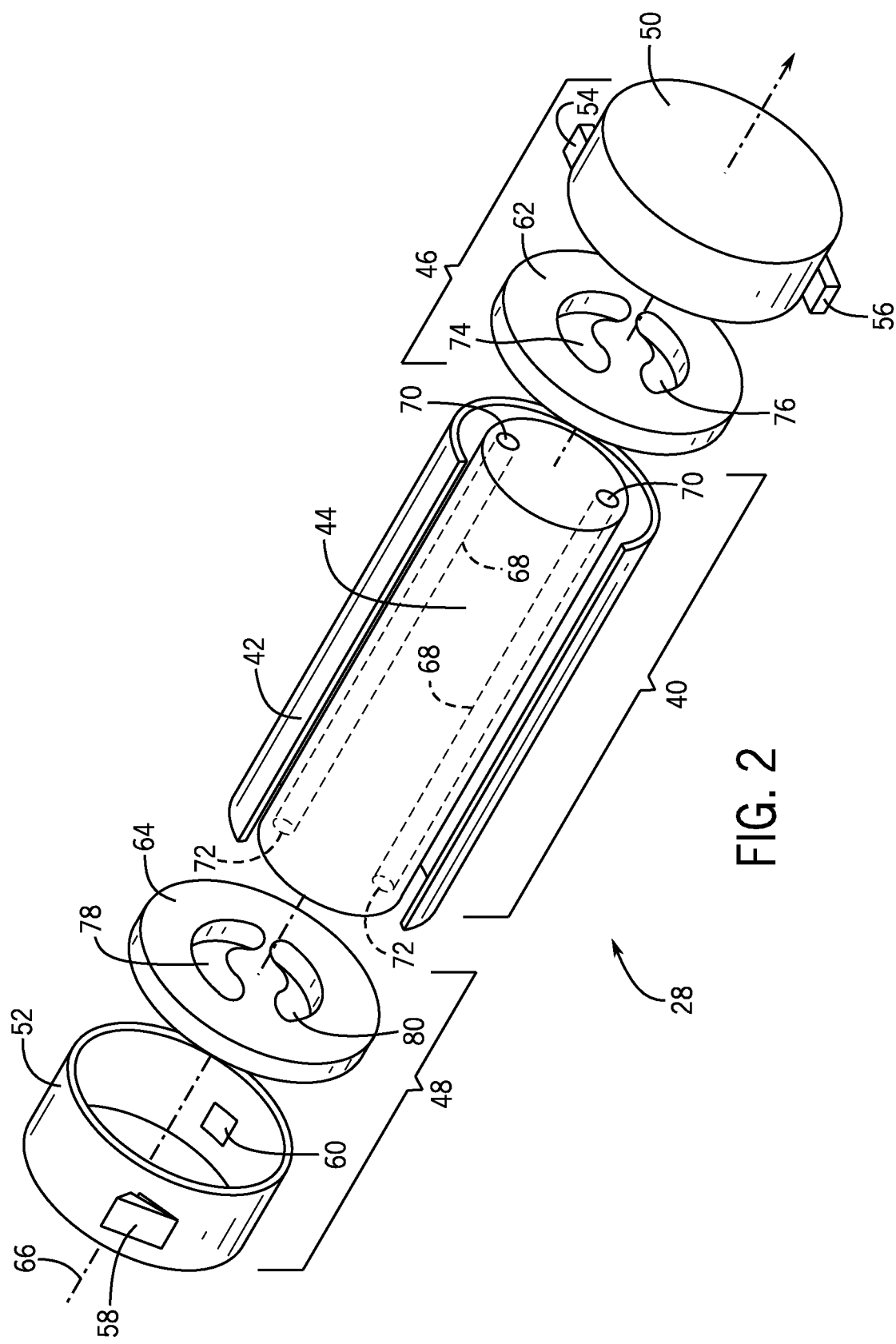
FIG. 2 is an exploded perspective view of an embodiment of the hydraulic energy transfer system of FIG. 1, illustrated as a rotary isobaric pressure exchanger (IPX) system.

FIG. 2 is an exploded view of an embodiment of the IPX 28 (e.g., a rotary IPX). In the illustrated embodiment, the IPX 28 may include a generally cylindrical body portion 40 that includes a housing 42 and a rotor 44. The IPX 28 may also include two end structures 46 and 48 that include manifolds 50 and 52, respectively. Manifold 50 includes inlet and outlet ports 54 and 56 and manifold 52 includes inlet and outlet ports 60 and 58. For example, inlet port 54 may receive a high-pressure first fluid and the outlet port 56 may be used to route a low-pressure first fluid away from the IPX 28. Similarly, inlet port 60 may receive a low-pressure second fluid and the outlet port 58 may be used to route a high-pressure second fluid away from the IPX 28. The end structures 46 and 48 include generally flat end plates 62 and 64, respectively, disposed within the manifolds 50 and 52, respectively, and adapted for fluid sealing contact with the rotor 44. The rotor 44 may be cylindrical and disposed in the housing 42, and is arranged for rotation about a longitudinal axis 66 of the rotor 44. The rotor 44 may have a plurality of channels 68 extending substantially longitudinally through the rotor 44 with openings 70 and 72 at each end arranged symmetrically about the longitudinal axis 66. The openings 70 and 72 of the rotor 44 are arranged for hydraulic communication with the end plates 62 and 64, and inlet and outlet apertures 74 and 76, and 78 and 80, in such a manner that during rotation they alternately hydraulically expose fluid at high pressure and fluid at low pressure to the respective manifolds 50 and 52. The inlet and outlet ports 54, 56, 58, and 60, of the manifolds 50 and 52 form at least one pair of ports for high-pressure fluid in one end element 46 or 48, and at least one pair of ports for low-pressure fluid in the opposite end element, 48 or 46. The end plates 62 and 64, and inlet and outlet apertures 74 and 76, and 78 and 80 are designed with perpendicular flow cross sections in the form of arcs or segments of a circle.

With respect to the IPX 28, a plant operator has control over the extent of mixing between the first and second fluids 18 and 20, which may be used to improve the operability of the fluid handling system (e.g., fracturing equipment or the frac system 10). For example, varying the proportions of the first and second fluids 18 and 20 entering the IPX 28 allows the plant operator to control the amount of fluid mixing within the fluid handling system. Three characteristics of the IPX 28 that may affect mixing are: (1) the aspect ratio of the rotor channels 68, (2) the short duration of exposure between the first and second fluids 18 and 20, and (3) the creation of a fluid barrier (e.g., an interface) between the first and second fluids within the rotor channels 68. First, the rotor channels 68 are generally long and narrow, which stabilizes the flow within the IPX 28. In addition, the first and second fluids 18 and 20 may move through the channels 68 in a plug flow regime with very little axial mixing. Second, in certain embodiments, at a rotor speed of approximately 1200 rotation per minute (RPM), the time of contact between the first and second fluids 18 and 20 may be less than approximately 0.15 seconds, 0.10 seconds, or 0.05 seconds, which again limits mixing of the streams 18 and 30. Third, a small portion of the rotor channel 68 is used for the exchange of pressure between the first and second fluids 18 and 20. Therefore, a volume of fluid remains in the channel 68 as a barrier between the first and second fluids 18 and 20. All these mechanisms may limit mixing within the IPX 28.

In addition, because the IPX 28 is configured to be exposed to the first and second fluids 18 and 20, certain components of the IPX 28 may be made from materials compatible with the components of the first and second fluids 18 and 20. In addition, certain components of the IPX 28 may be configured to be physically compatible with other components of the fluid handling system (e.g., fracturing equipment or the frac system 10). For example, the ports 54, 56, 58, and 60 may comprise flanged connectors to be compatible with other flanged connectors present in the piping of the fluid handling system. In other embodiments, the ports 54, 56, 58, and 60 may comprise threaded or other types of connectors.

Figure 3:
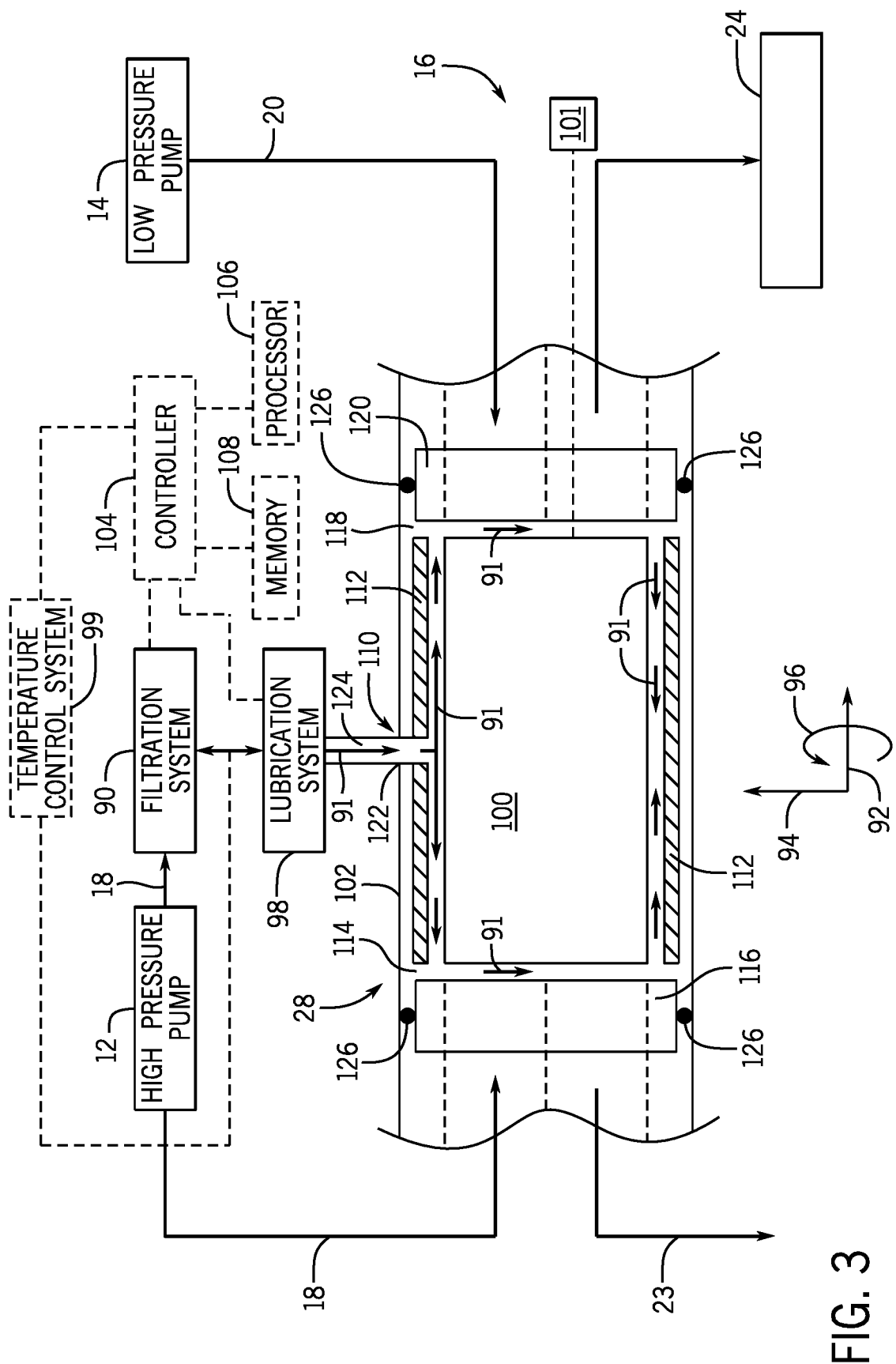
FIG. 3 is a schematic diagram of an embodiment of the IPX system of FIG. 2, illustrating a filtration system.

FIG. 3 is a schematic diagram of an embodiment of the IPX 28 (e.g., rotary IPX) of FIG. 2 coupled to a filtration system 90. In the illustrated embodiment, the IPX 28 is orientated with respect to an axial axis 92, a radial axis 94, and a circumferential axis 96. In operation, the IPX 28 uses a rotor 100 (e.g., the rotor 44 in FIG. 2) to transfer pressure from the first fluid 18, pumped by the high-pressure pump 12, to the second fluid 20, pumped by the lower pressure pump 14. The first fluid 18 and/or the second fluid 20 may be a highly viscous or particulate laden fluid. Over time, these fluids 18 and 20 may slow or block the rotation of the rotor 100 or may even block startup of the IPX 28 with fluid leftover from previous operations. Accordingly, the IPX 28 includes the lubrication system 98 that may pump (e.g., via a pump, such as the high pressure pump 12 or a dedicated pump as will be discussed in FIGS. 8-10) or direct a lubrication fluid through the IPX 28 before, during, and/or after operation of the IPX 28 to lubricate the rotating components of the IPX 28 during operation.

In certain embodiments, the lubrication system 98 is fluidly coupled to the filtration system 90 that filters out particulates suspended within the lubrication fluid before the lubrication fluid is supplied to the IPX 28. In certain embodiments, the filtration system 90 receives a small fraction of high-pressure fluid 18 from the high-pressure pump 12, such as a small amount of high-pressure proppant free fluid (e.g., water). Accordingly, the filtration system 90 may filter the small fraction of the high-pressure fluid (e.g., the first fluid 18) flowing into the IPX 28 as lubrication fluid.

As may be appreciated, clean lubrication fluid as indicated by arrows 91 may be routed into the IPX 28 via a lubrication flow channel that is separate from the total flow of the high pressure fluid (e.g., the first fluid 18). The separate lubrication channel may be external an IPX housing 102 (e.g., the housing 42), or may be integral to the IPX housing 102, as depicted within the embodiments illustrated in FIGS. 4-7. The separate channel allows the filtration system 90 to operate independently from or concurrently with the steady state operations of the IPX 28. For example, the lubrication system 98 may provide the IPX 28 with the clean lubrication fluid before and/or during steady state operations of the IPX 28.

In certain embodiments, the IPX 28 includes a controller 104 coupled to a processor 106 and a memory 108 that stores instructions executable by the processor 106 for controlling the filtration system 90 and/or the lubrication system 98. For example, the controller 104 may control one or more valves (e.g., electronic actuators that open and close the valves), filters, flow rates, and so forth of the filtration system 90 and/or the lubrication system 98. Furthermore, the controller 104 may communicate with one or more sensors disposed throughout the hydraulic energy transfer system 16, such as, for example, rotational speed sensors, pressure sensors, flow rate sensors, acoustic sensors, etc. The sensors may provide an input to the controller 104 related to the operations of the various systems, including any reduced efficiency within the IPX 28. For example, the sensors may sense an increase in the amount of particulates within the lubrication fluid, which may prevent the lubrication fluid from properly lubricating the IPX 28. In response to input from the sensors, the controller 104 may monitor and control the IPX 28 to determine any necessary operations changes to be made to the filtration system 90. For example, the controller 104 may increase the flow of lubrication fluid to the filtration system 90, increase the number of operational filters, increase or decrease the speed of the lubrication fluid flow within the filtration system 90, increase the amount of particulates removed from the lubrication fluid, and so forth.

In certain embodiments, the lubrication channel and the clean lubrication fluid (e.g., lubrication fluid removed of particulates via the filtration system) may be supplied through one or more apertures 110 disposed along the axial axis 92. The one or more apertures 110 may run through the IPX body, such as through the IPX housing 102 and/or rotor sleeves 112. For example, the apertures 110 may be along the axial axis 92 of the IPX 28 and/or positioned circumferentially about the circumferential axis 96 of the IPX 28. For example, the IPX housing 102 may have a first aperture 114 axially positioned between a first end cover 116 and the rotor 100 and a second aperture 118 axially positioned between a second end cover 120 and the rotor 100, such that the first and second apertures 114 and 118 provides a channel through the IPX housing 102. As a further example, the IPX housing 102 may include a third aperture 122 axially positioned along the rotor 100, such that it provides a channel 124 through the IPX housing 102 and the rotor sleeve 112. The one or more apertures 110 direct the clean lubrication fluid into gaps between the rotor 100 and the rotor sleeve 112, and provide lubrication fluid free of particulates for the lubrication of rotating components of the IPX 28. In certain embodiments, the end covers 116 and 120 and one or more gaskets or O-rings 126 may retain the clean lubrication fluid within the gaps between the rotor 100 and the rotor sleeve 112.

In certain embodiments, the rotor 100 may be coupled to a motor 101 to drive the rotation of the rotor 100. The motor 101 may be coupled to the controller 104, such that the operation of the motor 101 is controlled by the controller 104 to regulate the operation and/or rotational speed of the rotor 100. The rotor 100 may be partially or entirely driven by the motor 101. The motor 101 may be an electric motor, pneumatic drive, hydraulic drive, and so forth. In some embodiments, the pump (e.g., the high pressure pump 12 or a dedicated pump as will be discussed in FIGS. 8-10) of the lubrication system 98 may be coupled to the motor 101. As such, the operation (e.g., pumping rate, speed, pressure, volume, etc.) of the pump may match the operation of the rotor 100. For example, the operation of a positive displacement pump may be regulated to provide a lubrication fluid flow rate that is proportional to the rotational speed of the rotor 100.

In certain embodiments, the lubrication fluid (e.g., the lubrication fluid prior to entering the filtration system 90 and/or the lubrication system 98, or the lubrication fluid after being treated by the filtration system 90 and/or the lubrication system 98) may be routed (e.g., through internal or external routing paths to the IPX 28) to a temperature control system 99 to regulate (e.g., increase or decrease) the temperature of the lubrication fluid. The temperature control system 99 may be any suitable heat exchanger. As will be discussed in more detail, the lubrication fluid may serve to provide local and/or overall cooling or heating of the IPX 28.

Figure 4:
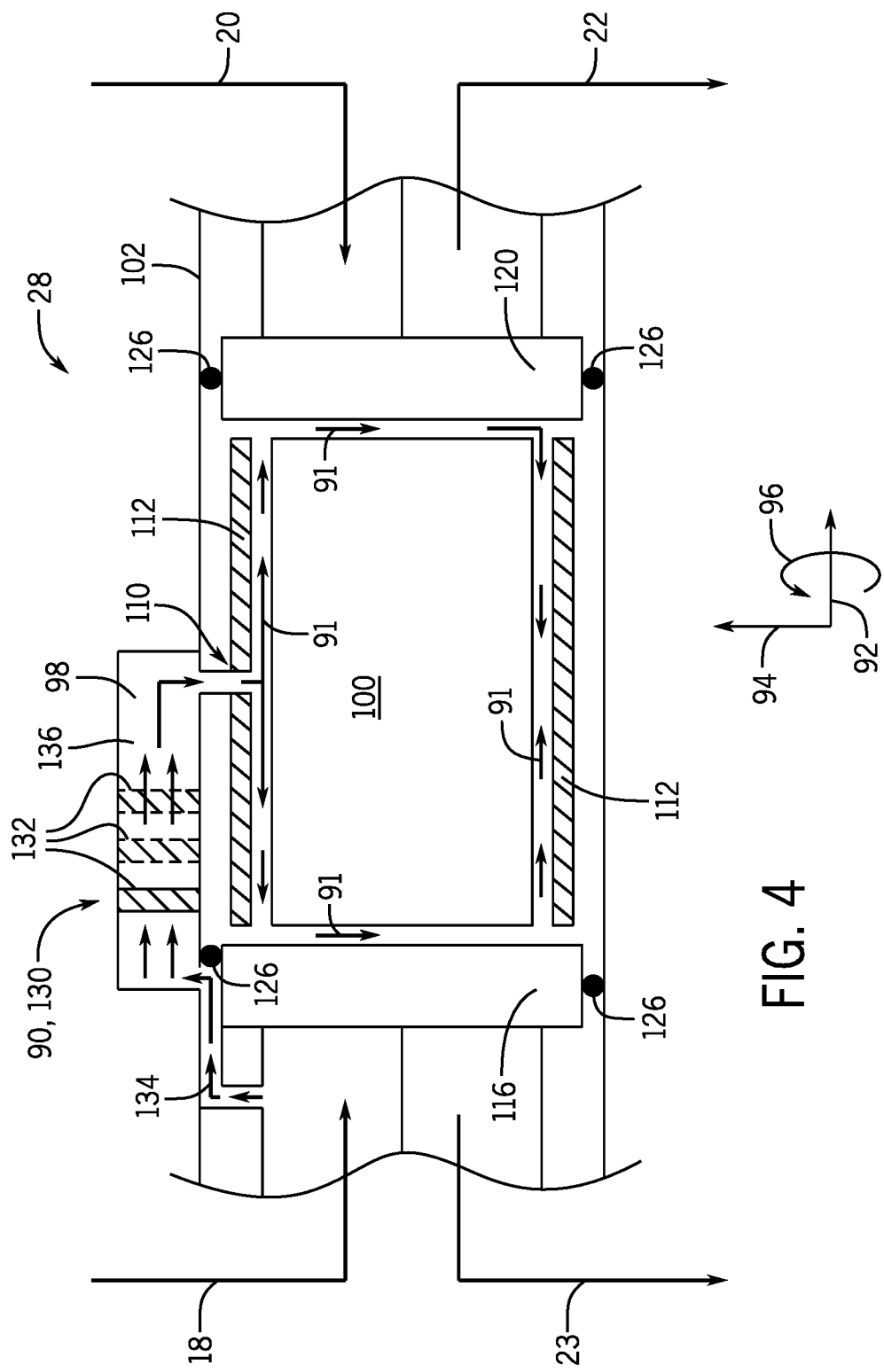
FIG. 4 is a schematic diagram of an embodiment of the IPX system of FIG. 2, illustrating an embodiment of an integrated filtration system with a plurality of filters.

FIG. 4 is a schematic diagram of an embodiment of the IPX 28 of FIG. 2, illustrating an embodiment of an integrated filtration system 130 with a plurality of filters 132. In the illustrated embodiment, the filtration system 90 is integrated with the IPX housing 102. Furthermore, the filtration system 90 receives a small portion 130 of the first fluid 18 pumped by the high-pressure pump 12 from the total flow of the high-pressure fluid provided to the IPX 28. In this manner, the small portion 134 of the first fluid 18 pumped to the IPX 28 is functioning as the lubrication fluid may be filtered via a separate channel 136 before being routed through the one or more apertures 110 to the gaps between the rotor 100 and the rotor sleeve 112.

The filtration system 90 may utilize one or more different types of filtering techniques and may include one or more different types of filtering devices or equipment. For example, in certain embodiments, the filtration system 90 includes one or more different types of filters, including cartridge filters, slow sand filters, rapid sand filters, pressure filters, bag filters, membrane filters, granular micro media filters, backwashable strainers, backwashable sand filters, hydrocyclones, and so forth. Furthermore, the filtration system 90 may include a plurality of filters 132, including one or more filters of each type within the filtration system 90. In certain embodiments, the filters 132 may be arranged around the axial axis 92, the radial axis 94, the circumferential axis 96, or in any other combination. For example, the plurality of filters 132 may be arranged concentrically around the circumferential axis 96 of the filtration system 90. In other embodiments, the plurality of filters 132 may be arranged in other patterns or arrangements, and may be spaced at a certain distance, randomly arranged, and so forth.

Figure 5:
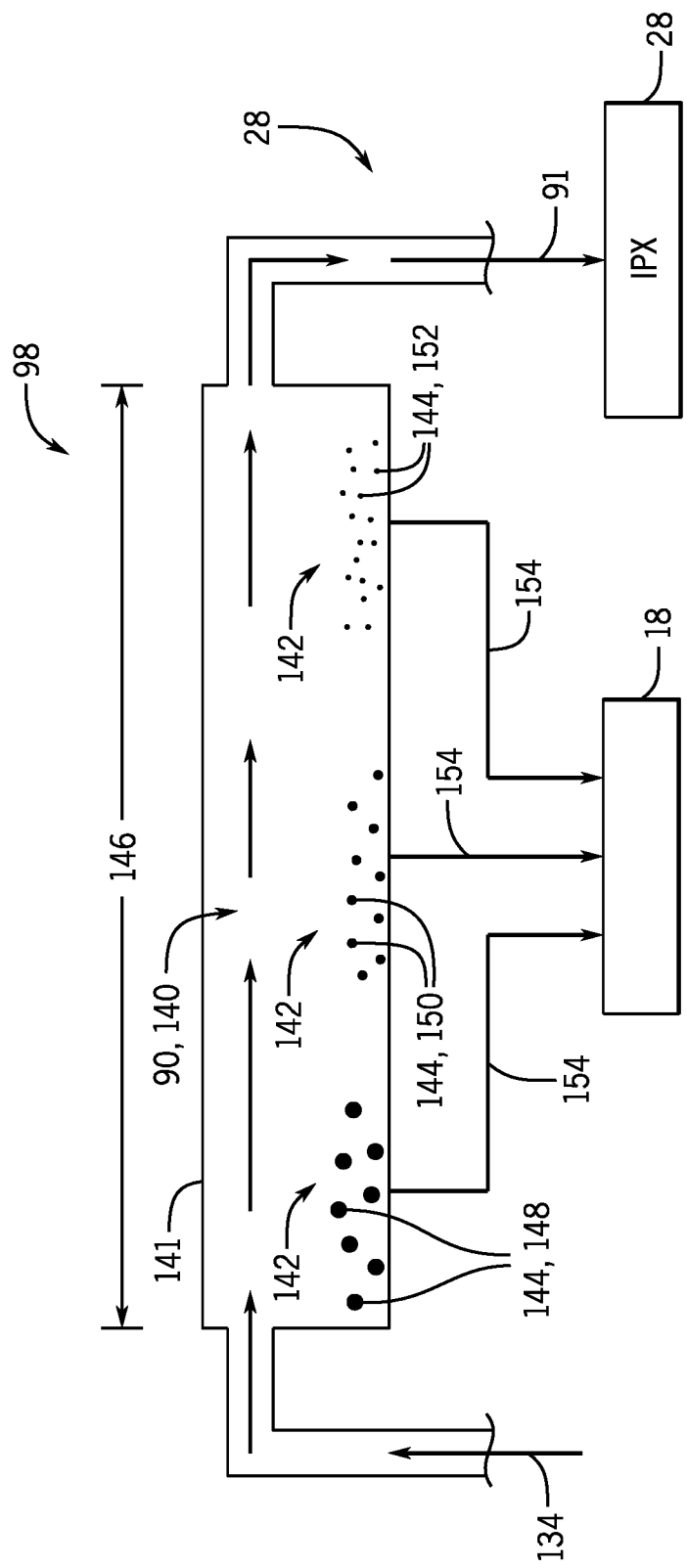
FIG. 5 is a schematic diagram of an embodiment of the integrated filtration system of FIG. 4, illustrating a settling filtration system.

FIG. 5 is a schematic diagram of an embodiment of the integrated filtration system 130 of FIG. 4, illustrating a settling filtration system 140. For example, the settling filtration system 140 may include one or more regions 142 where different types and sizes of particles 144 accumulate, before being routed out of the settling filtration system 140. In some embodiments, the settling filtration system 140 may include settling tanks, cavities, reservoirs, containers, and so forth 141. Further, the cavity or tank 141 of the settling filtration system 140 may be adjacent and/or surrounding the IPX 28. In the illustrated embodiment, the filtration system 90 may be integrated into the IPX housing 102, as illustrated in FIG. 4. In particular, the filtration system 90 may be the settling filtration system 140 that may extend along a distance 146 of the body of the IPX 28. In some embodiments, the length or distance 146 of the settling filtration system 140 may be customized based on the type and/or degree of filtration desired for the IPX 28. In certain embodiments, the accumulated particles 142 (e.g., particles filtered out of the lubrication flow) may be routed back into the high-pressure fluid flow.

In the illustrated embodiment, the settling filtration system 140 receives the small portion 134 of high-pressure fluid from the total flow of the high-pressure fluid (e.g., the first fluid 18) provided to the IPX 28, such as a small amount of high-pressure proppant free fluid (e.g., water). The small amount of high-pressure fluid may be utilized as a lubrication fluid within the IPX 28. As noted above with respect to FIG. 4, the small portion 134 of the first fluid 18 pumped to the IPX 28 that is functioning as the lubrication fluid may be filtered via the separate channel 136 before being routed through the one or more apertures 110 to the gaps between the rotor 100 and the rotor sleeve 112 and/or to the gaps between other bearing or lubrication regions. Accordingly, it should be noted that in the illustrated embodiment, a portion of the total flow of the high-pressure fluid (e.g., the first fluid 18) may not be filtered, while in other embodiments, additional portions or the entire total flow of the high-pressure fluid may be filtered with the filtration system 90. In some embodiments, this portion may be a small portion, while in others, this portion may be a large portion of the entire total flow of the high-pressure fluid. The portion of the total flow of the high-pressure fluid may be determined by the amount of lubrication fluid desired.

The lubrication fluid may be processed through the settling filtration system 140 to clean and remove any particles before the clean lubrication fluid 91 is routed through the one or more apertures 110 to the gap between the rotor 100 and the rotor sleeve 112. The settling tank 141 may be a single tank or cavity, or may include one or more series of tanks, where each tank is configured to filter out various sizes of particles 144. In certain embodiments, the lubrication fluid may pass through the length of the settling tank 141 with a slow flow velocity, such that the particles 144 settle out due to gravity. For example, in the illustrated embodiment, larger and coarser particles 148 may settle out of the lubrication fluid first, followed by intermediate particles 150 and/or finer particles 152. It should be noted that intermediate particles 150 and/or finer particles 152 may settle out of the lubrication fluid based on the flow velocity and/or the length 146 of the settling filtration system 140. For example, finer particles 152 may be filtered through regions 142 of the settling filtration system 140 where the flow velocity is very slow. In some embodiments, a portion of the lubrication fluid (e.g., excess lubrication fluid) as indicated by arrows 154 may be routed to the flow of high-pressure fluid (e.g., the first fluid 18) provide to the IPX 28

FIG. 6 is a schematic diagram of an embodiment of the filtration system 90 of FIG. 3, illustrating a centrifugal separation filtration system 160. In the illustrated embodiment, the filtration system 90 may be integrated into the IPX housing 102, as illustrated in FIG. 4, and/or the filtration system 90 may be external to the IPX components, as illustrated in FIG. 3. The centrifugal filtration system 160 may utilize centripetal forces and fluid resistance to separate and/or sort particles, thereby filtering and/or cleaning the lubrication fluid before providing the clean lubrication fluid 91 to the gap between the rotor 100 and rotor sleeve 112 and/or to the gaps between other bearing or lubrication regions.

In certain embodiments, the centrifugal filtration system 160 may include an inlet 162 configured to receive the small portion 134 of high-pressure fluid (e.g., the first fluid 18) from the total flow of the high-pressure fluid provided to the IPX 28, such as a small amount of high-pressure proppant-free fluid (e.g., water). In other embodiments, the inlet 162 may be configured to receive the small portion 134 of high-pressure fluid directly from the high pressure pump 12. The centrifugal filtration system 160 may include a variety of geometries, and may include a cyclone region 164 having a vortex and/or apex 166. In particular, the centrifugal filtration system 160 may be configured to remove particles suspended within the lubrication fluid that are (more or) less dense than the surrounding fluid, and may do so based on the characteristics of the fluid flow through the inlet and the geometry of the cyclone region 164. In the illustrated embodiment, denser particles 168 may be removed at the apex 166 and routed back (e.g., indicated by an arrow 170) to the flow of high-pressure fluid (e.g., the first fluid 18) provide to the IPX 28. Further, the cleaned lubrication fluid may be at an overflow region 172 of the cyclone region 164, and may be provided to the IPX 28 such that it is between the rotor 100 and the rotor sleeve 112 and/or gaps between other bearing or lubrication regions. Indeed, the centrifugal filtration system 160 may require no additional moving parts and/or maintenance, because any unwanted particles filtered out of the lubrication fluid may be routed back to the first fluid 18 (e.g., high-pressure fluid).

FIG. 7 is a schematic diagram of an embodiment of the IPX 28 of FIG. 2, illustrating the filtration system 90 disposed within the rotor 100. In the illustrated embodiment, the filtration system 90 may be integrated into the rotor 100 of the IPX 28. In particular, the filtration system 90 may be incorporated into a central region 180 of the IPX 28, such as through cylindrical space within the rotor 100. In particular, the filtration system 90 receives the small portion 134 of the first fluid 18 pumped by the high-pressure pump 12 from the total flow of the high-pressure fluid provided to the IPX 28. Furthermore, the filtration system 90 disposed through the rotor 100 may include one or more filtration techniques/methods and/or one or more filtration devices, such as any of the ones described above with respect to FIGS. 3-6. In certain embodiments, the filtration system 90 may utilize the rotation of the rotor 100 to enhance centrifugal separation. Once the lubrication fluid is filtered, the clean lubrication fluid 91 may exit the rotor region of the IPX 28 via the one or more apertures 110, and may flow to the gaps between the rotor 100 and the rotor sleeve 112 and/or to the gaps between other bearing or lubrication regions, as described above.

Figure 8:
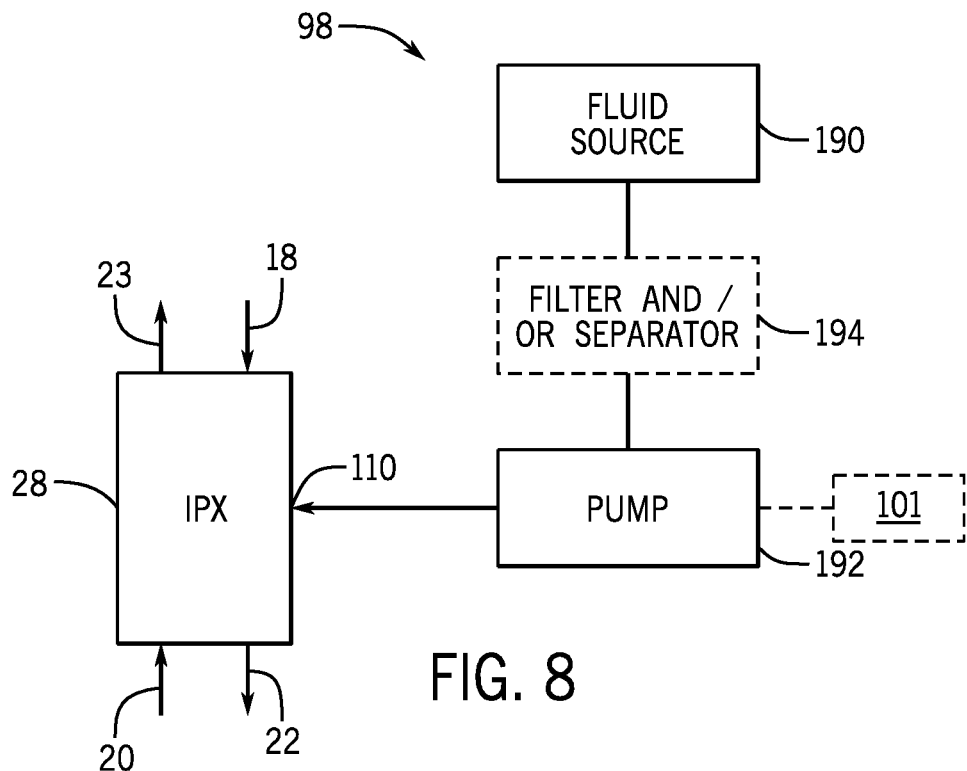
FIG. 8 is a block diagram of an embodiment of the IPX system of FIG. 2 coupled to a lubrication system having a dedicated lubrication fluid supply source.

FIG. 8 is a block diagram of an embodiment of the IPX 28 of FIG. 2 coupled to the lubrication system 98 to provide lubrication fluid to the IPX 28. In the illustrated embodiment, the lubrication system 98 may include a dedicated fluid source 190 and a dedicated pump 192 (e.g., external or internal pump) to pump a fluid from the fluid source 190 to the IPX 28. The pump 192 may be a positive displacement pump or a centrifugal pump, and may be used in combination with one or more valves. In particular, the pump 192 may increase the pressure of the fluid entering the IPX 28. The fluid provided by the fluid source 190 may be a lubrication fluid and/or a flush fluid (e.g., flushing the bearing and seal areas of contaminants and/or particulates). In certain embodiments, the lubrication system 98 may include a filter and/or separator 194 to filter and/or clean the fluid before the fluid enters the IPX 28. The filter and/or separator 194 may be any suitable filtration system set forth above (e.g., systems 90, 130, 140, and 160) or a combination thereof.

Figure 9:
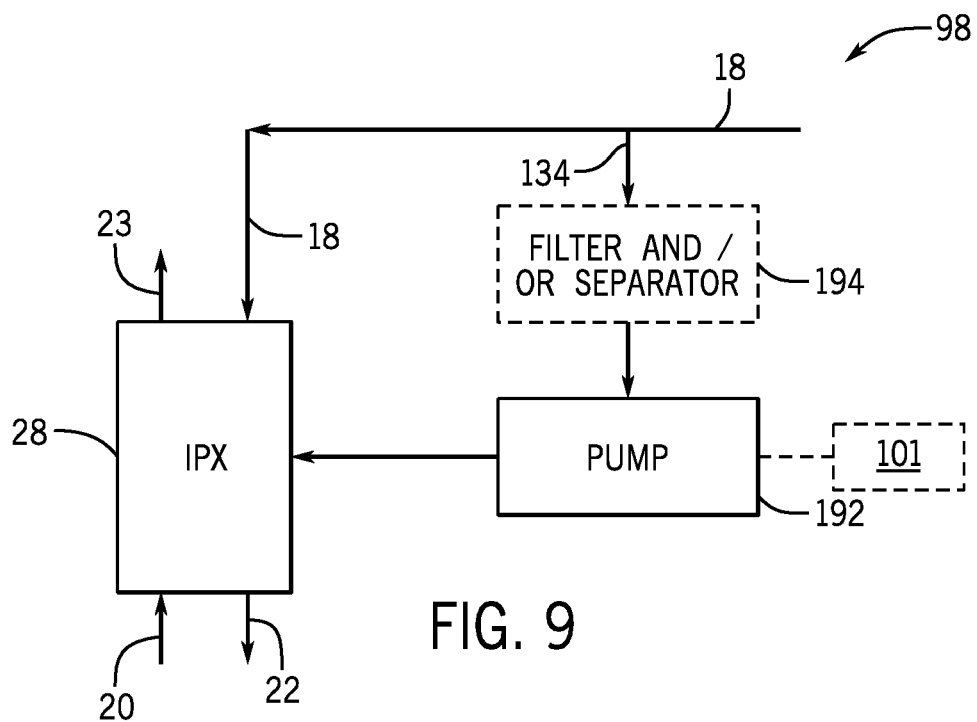
FIG. 9 is a block diagram of an embodiment of the IPX system of FIG. 2 coupled to a lubrication having a dedicated pump to direct the lubrication fluid.

FIG. 9 is a block diagram of an embodiment of the IPX 28 of FIG. 2 coupled to the lubrication system 98 to provide lubrication fluid to the IPX 28. In the illustrated embodiment, the lubrication system 98 includes the dedicated pump 192 as set forth above, and instead of the dedicated fluid source 190, a fraction (e.g., the small portion 134) of the first fluid 18 is utilized as the lubrication fluid. In certain embodiments, the lubrication system 98 may include the filter and/or separator 194 to filter and/or clean the portion of the small portion 134 of the first fluid 18 before it enters the IPX 28. The filter and/or separator 194 may be any suitable filtration system set forth above (e.g., systems 90, 130, 140, and 160) or a combination thereof. The pump 192 may boost the pressure of the small portion 134 of the first fluid 18. The pump 192 may provide pressure to overcome pressure losses from passing through the filter and/or separator 194. The pump 192 may provide additional pressure to the fluid or lubrication fluid flowing into the IPX 28.

It should be noted that the term "lubrication fluid" may serve several functions or a combination thereof. First, the lubrication fluid may serve to supply fluid bearings, such as to function as hydrostatic bearings, hydrodynamic bearings, or a combination thereof. Second, the lubrication fluid may serve to flush and/or clean seal areas, such as seals formed by narrow clearances in the IPX 28. Third, the lubrication fluid may serve to flush and/or clean debris or particles from the bearing areas. Fourth, the lubrication fluid may serve to provide local and/or overall cooling or heating of the IPX 28. Accordingly, several present embodiments are directed to controlling fluids entering and/or flowing within the IPX 28 (e.g., controlling one or more fluid flow paths) and/or operation of the IPX 28. For example, the lubrication fluid may flow to one or more of flow paths, such as flow paths of the first fluid 18, the second fluid 20, the high-pressure frac fluid 22, and the low-pressure frac fluid 23. For example, the lubrication fluid may be controlled to enter the IPX 28 at a pressure equal to or greater than that of the first fluid 18.

Figure 10:
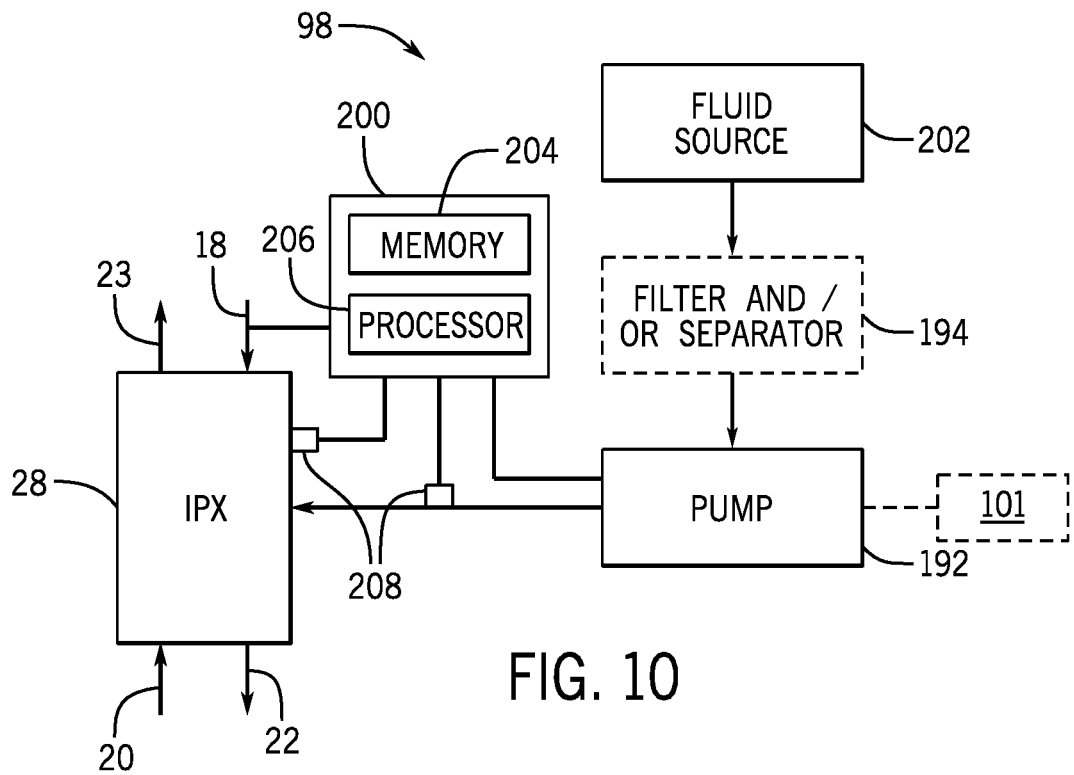
FIG. 10 is a block diagram of an embodiment of a controller operatively coupled to a lubrication system.

With the foregoing in mind, FIG. 10 shows a block diagram of an embodiment of the lubrication system 98, operatively coupled to a controller 200. In the illustrated embodiment, the lubrication fluid system 98 includes a fluid source 202, which may be the dedicated fluid source 190 as discussed in the FIG. 8 or may be the small portion 134 of the first fluid 18 as discussed in FIG. 9. The lubrication fluid system 118 also includes the pump 192 (e.g., a dedicated pump, internal or external) and may optionally include the filter and/or separator 194 as set forth above. It will be appreciated that at least a portion of the operation of the IPX 28 and the operation of the lubrication fluid system 98 are controlled by the controller 200 to regulate the flow rate, flow volume, pressure, and/or temperature of the lubrication fluid and/or other fluids (e.g., the first fluid 18) depending on routing of the lubrication fluid (e.g., flow path and where the lubrication fluid enters the IPX 28).

The controller 200 includes a memory 204 (e.g., a non-transitory computer-readable medium/memory circuitry) storing one or more sets of instructions (e.g., processor-executable instructions) implemented to control or regulate at least a portion of the operation of the IPX 28 and the operation of the lubrication system 98. The controller 200 also includes one or more processor 206 configured to access and execute the one or more sets of instructions encoded by the memory 204, associated with at least a portion of the operation of the IPX 28 and the operation of the lubrication system 98. The memory 204 may include volatile memory, such as random access memory (RAM), and/or non-volatile memory, such as read-only memory (ROM), optical drives, hard disc drives, or solid-state drives. The one or more processor 206 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits.

Furthermore, the controller 200 may be communicatively coupled to one or more sensors 208 to collect data related to fluid flow, such as flow rate, flow volume, pressure, temperature of the lubrication fluid, the first fluid 18, the second fluid 20, the main process fluid (e.g., cleaned or filtered first fluid 18 and/or second fluid 20), etc. The one or more sensors 208 may include but not limited to pressure sensors, temperature sensors, flow meters, and flow sensors. The one or more sensors 208 may be disposed at any suitable locations along the fluid flow paths to obtain data related to the fluid flow of interest upon receiving instruction(s) or control signal(s) from the controller 200. In some embodiments, the controller 200 and the controller 104 (in FIG. 3) are the same controller.

The pressure of the lubrication fluid entering the IPX 28 may depend on the pressure of the first fluid 18 as in FIG. 9 (e.g., the small portion 134 of the first fluid 18 is routed to serve as the lubrication fluid) and/or may depend on the pressure of the fluid flowing out of the pump 192 as in FIGS. 8 and 9. In addition, the pressure of the lubrication fluid entering the IPX 28 may depend on the operation of the filter and/or separator 194. For example, the fluid passing through the filter and/or separator 194 may experience certain pressure losses. As such, to control or regulate the pressure of the lubrication fluid entering the IPX 28, in one embodiment, to control the pressure of the first fluid 18 and/or pressure the small portion 134 of the first fluid 18 routed to serve as the lubrication fluid, the controller 200 is operatively coupled to one or more valves disposed along the flow path of the first fluid 18, along the flow path of the small portion 134 of the first fluid 18, the high pressure pump 12, or a combination thereof. In one embodiment, the controller 200 is operatively coupled to the pump 192 to control or regulate the pressure of the fluid flow (e.g., lubrication fluid) out of the pump 192. In one embodiment, the controller 200 may control or regulate the pump 192 to increase pressure to overcome pressure losses at the filter and/or separator 194.

In certain embodiments, the pump 192 as shown in FIGS. 8-10 may be coupled to the motor 101. As such, the operation (e.g., pumping rate, speed, pressure, volume, etc.) of the pump 192 may be regulated to match the operation of the rotor 100. For example, the pump 192 may be a displacement pump and may be regulated to provide a lubrication fluid rate that is proportional to the rotational speed of the rotor 100.

Figure 11:
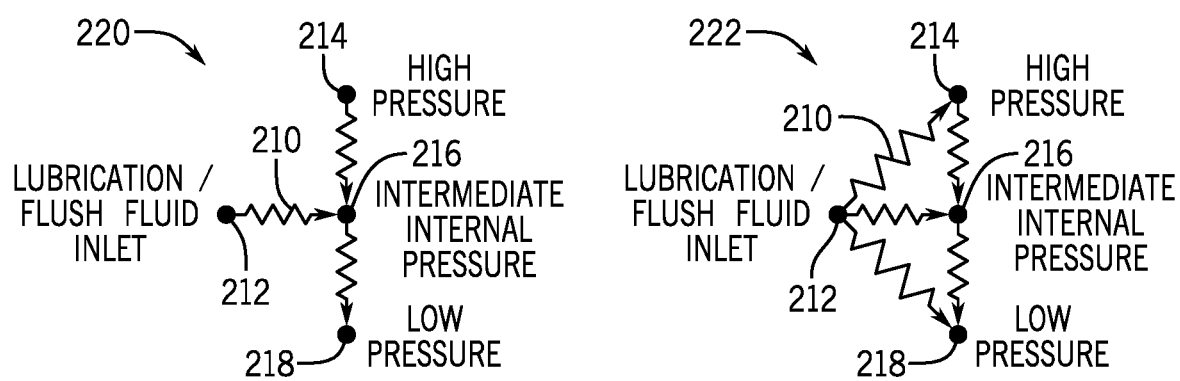
FIG. 11 is a partial circuit diagram of lubrication fluid, illustrating routing of the lubrication fluid.

Further, the controller 200 may control or regulate the lubrication fluid flow (e.g., flow rate, flow volume) into the IPX 28 depending on the routing of the lubrication fluid (e.g., where the lubrication fluid enters the IPX 28) as will be discussed in FIG. 11. FIG. 11 shows partial circuit diagrams of the lubrication fluid. In the illustrated embodiment, a resistance symbol 210 represents the resistance (e.g., flow resistance) of the lubrication fluid path or other fluid resistance, an arrow represents the flow direction, and a circle symbol represents a pressure of a location interest. In particular, a circle 212 represents the pressure of the lubrication fluid at an inlet into the IPX 28, a circle 214 represents the pressure of the first fluid 18 at the high pressure fluid inlet into the IPX 28, a circle 216 represents the pressure of the fluid within the IPX 28 wherein there may be mixing between the first fluid 18 and the second fluid 20, and a circle 218 represents the pressure of the second fluid 20 at the the low pressure fluid inlet into the IPX 28.

In an example partial circuit diagram 220, the lubrication fluid flows to an internal region of the IPX 28 where the pressure 216 is an intermediate value between the pressure 214 and the pressure 218. Accordingly, the pressure of lubrication fluid 212 may be higher or lower than the pressure 214. In another example partial circuit diagram 222, the lubrication fluid may flow to any of the internal region of the IPX 28, the high pressure inlet of the first fluid 18, the low pressure inlet of the second fluid 20, or a combination thereof. Accordingly, it may be desirable for the lubrication fluid to have a pressure (e.g., the pressure 212) that is equal to or greater than the pressure 214. It should also be noted that as the flow rate of the fluid increases, the pressure downstream (e.g., the point where fluids merge) would tend to increase as a higher volume of fluid is flowing through per given time. In certain embodiments, the resistance(s) may be negligible between the pressure 212 at the lubrication fluid inlet and the pressure 214 at the high pressure inlet of the first fluid 18, and in this case, an increase in the pressure or flow rate of the lubrication fluid may essentially displace the first fluid 18.

Accordingly, the controller 200 may control or regulate the operation of the corresponding components of the IPX 28 and components of the lubrication fluid system 98 (e.g., one or more valves, the high pressure pump 12, the low pressure pump 14, the pump 192, etc.) to increase or decrease the pressure, flow rate, flow volume, or a combination thereof, at least in part based on the concepts discussed in the partial circuit diagrams 220 and 222. For example, in the case that the lubrication fluid is routed to enter the internal region of the IPX 28, the controller 200 may control the pump 192 and/or corresponding valve(s) to regulate the pressure of the lubrication fluid 212 to be higher or lower than the pressure 214. For example, in the case that the lubrication fluid is routed to enter any of the internal region of the IPX 28, the high pressure inlet of the first fluid 18, and/or the low pressure inlet of the second fluid 20, or a combination thereof, the controller 200 may control the pump 192 and/or corresponding valve(s) to increase the pressure of the lubrication fluid such that the pressure of the lubrication fluid is equal to or greater than the pressure of the first fluid 18 at the high pressure inlet.

In some embodiments, a control algorithm may be stored in the memory 204 and executable by the processor 206 of the controller 200. The control algorithm upon execution may modulate the flow rates of respective fluids (e.g., fluid pumped out by the pump 92, the small portion 134 of the first fluid 18) proportional to the operating pressure of the IPX 28 or some function of the operating pressure of the IPX 28 in order to supply a suitable amount of the lubrication fluid to the IPX 28. In some embodiments, the controller 200 may change the flow rate or pressure of the lubrication fluid in response to other variables, such as the performance or operating condition of the IPX 28. For example, if the performance of the IPX 28 decreases as a result of contaminated bearings, the controller 200 may control the flow rates of respective fluids (e.g., fluid pumped out by the pump 192, the small portion 134 of the first fluid 18) to increase the flow volume and/or flow rate of lubrication fluid into the IPX 28. In some embodiments, the controller 200 may control the flow rates of respective fluids (e.g., fluid pumped out by the pump 92, the small portion 134 of the first fluid 18) based on operating condition of the IPX, such as temperatures (e.g., measured temperature or expected temperature), to provide adequate cooling or heating to the IPX 28. In some embodiments, the controller 200 may control the temperature of respective fluids (e.g., fluid pumped out by the pump 92, the small portion 134 of the first fluid 18) based on temperatures (e.g., expected temperatures or temperatures measured via the one or more sensors 208) in the IPX 28 to provide adequate cooling or heating to the IPX 28.

Figure 12:
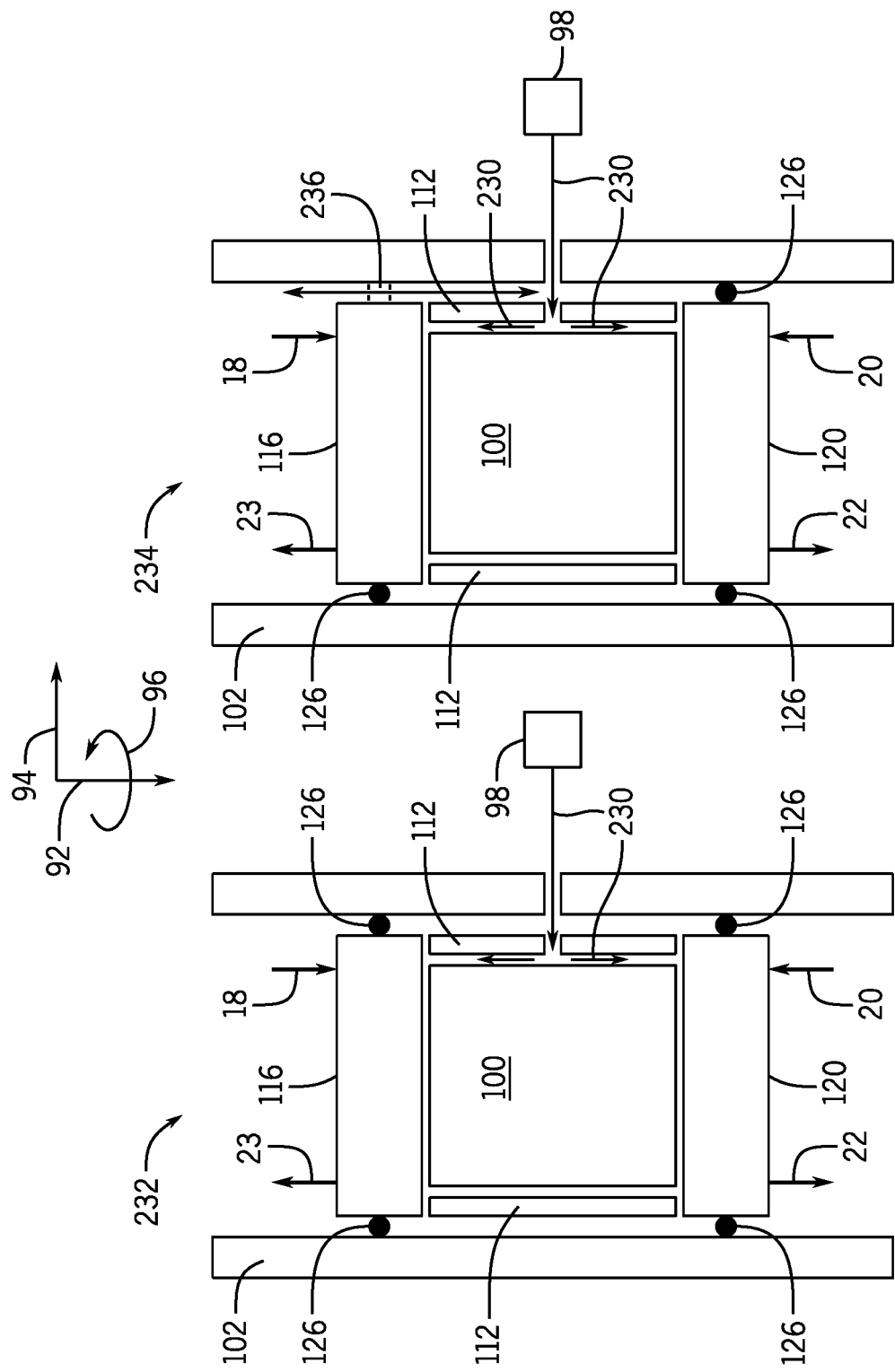
FIG. 12 is a schematic diagram of an embodiment of the IPX system of FIG. 2 coupled to a lubrication system.

As set forth above, the controller 200 may increase the fluid flow rate via controlling the pump 192 (e.g., a positive displacement pump, centrifugal pump) and/or via controlling one or more valves disposed along the respective flow path(s). In some embodiments, the controller 200 may also control the pump 192 and/or respective valves to cause an excess flow which overflows into the main process fluid (e.g., cleaned or filtered first fluid 18 and/or second fluid 20). FIG. 12 is a schematic diagram of an embodiment of the IPX 28 coupled to the lubrication system 98. In the illustrated embodiment, the lubrication fluid provided by the lubrication system 98 flows into the IPX 28 as indicated by arrows 230. As illustrated in diagram 232, the IPX 28 includes at one or more gaskets, O-rings, or other suitable seals 126 disposed between the first end cover 116 and the IPX housing 102 and between the second end over 120 and the IPX housing 102 on both axial ends, such that the lubrication fluid is separated or isolated from the main process fluid (e.g., cleaned or filtered first fluid 18 and/or second fluid 20). As illustrated in diagram 234, one of the one or more gaskets, O-rings, or other suitable seals 126 disposed between the first end cover 116 and the IPX housing 102 is replaced by a valve 236, such that the lubrication fluid may contact or communicate with the main process fluid (e.g., cleaned or filtered first fluid 18 and/or second fluid 20) depending on the operation of the valve 236 (e.g., open/close position of the valve). In some embodiments, the valve 236 is a check valve to allow overflow of lubrication fluid into the main process fluid but not flow in the reverse direction. In some embodiments, the valve 236 is a pressure relief valve to adjust or limit the pressure of the lubrication fluid. As may be appreciated, if the lubrication fluid is provided to the IPX 28 via separate flow paths such that the lubrication fluid is separated or isolated from the main process fluid (e.g., as illustrated in diagram 232), the pressure of the lubrication fluid may be mainly controlled via operation of the pump 192. However, if the lubrication fluid is in contact or communication with the main process fluid (e.g., as illustrated in diagram 234), the pressure of the lubrication fluid may be affected by the operation of the pump 192, the operation of the valve 236, the pressure of the main process fluid, or a combination thereof.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:
1. A system, comprising:
a hydraulic pressure exchanger configured to exchange pressures between a first fluid and a second fluid, wherein a first pressure of the first fluid is greater than a second pressure of the second fluid; and
one or more filters coupled to the hydraulic pressure exchanger, wherein a pathway within a housing of the hydraulic pressure exchanger enables a portion of the first fluid to be diverted to be filtered by the one or more filters to produce a lubrication fluid to be used by the hydraulic pressure exchanger.

2. The system of claim 1, wherein:
one or more sensors are configured to collect fluid data related to an operating condition of the system; and
a controller is configured to control at least one of a valve or a pump to selectively route the lubrication fluid into the hydraulic pressure exchanger based on the operating condition of the system.

3. The system of claim 2, wherein the fluid data comprises flow rate, flow volume, pressure, temperature, or a combination thereof.

4. The system of claim 1, wherein the one or more filters are integrated within the housing of the hydraulic pressure exchanger.

5. The system of claim 1, wherein the hydraulic pressure exchanger is a rotary isobaric pressure exchanger (IPX).

6. The system of claim 5, wherein the rotary IPX comprises the housing, a rotor disposed within the housing, a first end cover disposed within the housing, and a second end cover disposed within the housing, wherein the first end cover interfaces with a first axial end of the rotor, and wherein the second end cover interfaces with a second axial end of the rotor.

7. The system of claim 6, wherein the first end cover comprises a first fluid inlet, and wherein the pathway within the housing enables the portion of the first fluid to be diverted from upstream of the first fluid inlet towards an axial location of the housing that is downstream of the first end cover.

8. The system of claim 7, wherein the pathway diverts the portion of the first fluid through an aperture that extends through the housing, and wherein the lubrication fluid passes through a sleeve of the hydraulic pressure exchanger at the axial location into a gap between the rotor and the sleeve.

9. The system of claim 1 further comprising a heat exchanger configured to regulate temperature of the lubrication fluid.

10. The system of claim 1, wherein the one or more filters are physically connected to the housing of the hydraulic pressure exchanger.

11. A system, comprising:
a hydraulic pressure exchanger configured to exchange pressures between a first fluid and a second fluid, wherein a first pressure of the first fluid is greater than a second pressure of the second fluid; and
one or more filters physically connected to a housing of the hydraulic pressure exchanger, wherein a pathway within the housing of the hydraulic pressure exchanger enables a portion of the first fluid to be diverted to be filtered by the one or more filters to produce a lubrication fluid to be used by the hydraulic pressure exchanger.

12. The system of claim 11, wherein the system is configured to route, via one or more of the pathway, a pump, or a corresponding valve, the lubrication fluid to one or more of:
cool one or more heated regions of the hydraulic pressure exchanger;
heat one or more cold regions of the hydraulic pressure exchanger;
lubricate bearings of the hydraulic pressure exchanger; or flush debris or particles from components of the hydraulic pressure exchanger.

13. The system of claim 11, wherein the system is configured to regulate, via one or more of a pump or a corresponding valve, pressure of the lubrication fluid to be higher or lower than the first pressure of the first fluid responsive to the lubrication fluid being routed to enter an internal region of the hydraulic pressure exchanger.

14. The system of claim 11, wherein the system is configured to regulate, via one or more of a pump or a corresponding valve, pressure of the lubrication fluid to be equal to or greater than the first pressure of the first fluid responsive to the lubrication fluid being routed to merge with the first fluid.

15. The system of claim 11, wherein the hydraulic pressure exchanger is a rotary isobaric pressure exchanger (IPX), and the rotary IPX comprises the housing, a rotor disposed within the housing, a first end cover disposed within the housing, and a second end cover disposed within the housing, and wherein the first end cover interfaces with a first axial end of the rotor and the second end cover interfaces with a second axial end of the rotor.

16. The system of claim 15, wherein the first end cover comprises a first fluid inlet, and wherein the pathway within the housing enables the portion of the first fluid to be diverted towards an axial location of the housing that is downstream of the first end cover.

17. The system of claim 16, wherein the pathway diverts the portion of the first fluid through an aperture that extends through the housing, and wherein the lubrication fluid passes through a sleeve of the hydraulic pressure exchanger at the axial location into a gap between the rotor and the sleeve.

18. A system, comprising:
a rotary isobaric pressure exchanger (IPX) configured to exchange pressures between a first fluid and a second fluid, wherein a first pressure of the first fluid is greater than a second pressure of the second fluid, wherein the rotary IPX comprises a housing, a rotor disposed within the housing, a sleeve disposed around the rotor, a first end cover disposed within the housing, and a second end cover disposed within the housing, wherein the first end cover interfaces with a first axial end of the rotor, wherein the second end cover interfaces with a second axial end of the rotor, the first end cover having a first fluid inlet; and
one or more filters coupled to the rotary IPX, wherein, a pathway within the housing enables a portion of the first fluid to be diverted from upstream of the first fluid inlet through an aperture that extends through the housing to the one or more filters to filter the portion of the first fluid to produce a lubrication fluid to pass through the sleeve into a gap between the rotor and the sleeve.

* * * * *